United States Patent [19]

Korf

[11] 4,107,105

[45] Aug. 15, 1978

[54] CELLULAR UREA-FORMALDEHYDE RESIN AND METHOD OF PREPARING THE SAME

[75] Inventor: Heinz Ludwig Korf, Montreal, Canada

[73] Assignee: Rapperswill Corporation, New York, N.Y.

[21] Appl. No.: 841,997

[22] Filed: Oct. 14, 1977

[51] Int. Cl.$^2$ ............................................. C08J 9/30
[52] U.S. Cl. .................................... 521/80; 260/17.3; 521/188; 521/133
[58] Field of Search ............................ 260/2.5 F, 17.3

[56] References Cited

U.S. PATENT DOCUMENTS

| | | | |
|---|---|---|---|
| 3,313,745 | 4/1967 | Klug | 260/2.5 F |
| 3,979,341 | 9/1976 | Widmann | 260/2.5 F |

*Primary Examiner*—Morton Foelak
*Attorney, Agent, or Firm*—Hans Berman

[57] ABSTRACT

An aqueous solution of urea-formaldehyde prepolymer has improved storage life, and cellular urea-formaldehyde foam prepared by discharging the solution, a curing catalyst, and compressed air into the atmosphere develops fewer shrinkage cracks and is stronger when the solution contains at least 5% glucose, fructose, and/or sucrose.

9 Claims, No Drawings

CELLULAR UREA-FORMALDEHYDE RESIN AND METHOD OF PREPARING THE SAME

This invention relates to cellular plastic compositions, and particularly to improved, solid, urea-formaldehyde resin foam and to a method of making the same.

It is known from German Pat. No. 1,054,232 that the shrinkage cracks in cellular urea-formaldehyde resin produced by discharging a mixture of a compressed, inert gas and a catalyzed prepolymer solution into the atmosphere can be reduced by incorporating in the prepolymer solution a polyvalent alcohol, such as sorbitol.

It has now been discovered that carbohydrates, such as glucose, fructose, maltose, and sucrose, have the same crack preventing effect as sorbitol and additionally improve the shelf life of aqueous solutions of methylol urea and dimethylourea which are the principal prepolymers from which urea formaldehyde resin is made. The mechanical strength of cellular urea-formaldehyde resin compositions containing the carbohydrates is increased.

The carbohydrates are effective in about the same amounts as the polyhydric alcohols. In addition to their retarding action on the spontaneous polymerization of the prepolymers in aqueous solution, they have the advantage of being significantly cheaper and more readily available than sorbitol. While the carbohydrates mentioned above, particularly the monosaccharides, are effective when in chemically pure form, chemical purity is not essential to their successful use. Thus, crude invert sugar, a mixture obtained by cooking a sucrose solution with a small amount of mitric acid, and containing glucose, fructose, and residual sucrose in variable ratios depending on specific processing conditions, may be used to advantage, as well as such technical sugar solutions as corn syrup which may contain dextrins in addition to glucose and maltose.

The effects of the carbohydrate addition become economically significant only at amounts of the sugar or sugars corresponding to at least 5% of the weight of the prepolymer in the solution or in the solid plastic foam. Further improvement is achieved by increasing the weight ratio to approximately 13% of the prepolymer weight, but little if any benefits are derived from heavier sugar additions. More than about 20% sugar should be avoided because of undesirable secondary effects.

Other operating conditions are too well known to require detailed explanation. The mole ratio of formaldehyde and urea in the precondensate or prepolymer should be approximately 2:1 so that the prepolymer consists mainly of dimethylourea, but monomethylourea may be present and an excess of formaldehyde has no basically detrimental effect.

The gas employed for producing a foam from the catalyzed, sugar-bearing prepolymer solution in water sould be practically inert to the reactants, and air is entirely acceptable. Acid catalysts are known to be effective for curing the prepolymer to a solid, urea-formaldehyde resin. Phosphoric and oxalic acid have been used on a commercial scale, the former being preferred for reasons of lower cost and lower toxicity.

The temperature at which the water is evaporated from the cured foam is not critial. Ambient temperatures above freezing are generally adequate, and the low cost of the product normally does not justify the use of a drying oven, otherwise not objectionable. Thus, the foam is normally dried at temperatures between 0° to 40° C.

The amount of water in the prepolymer solution can be chosen over a fairly wide range and is normally determined by the design of the nozzle, the pressure of the gas and like secondary considerations. It is generally preferred that the amount of solutes in the foaming mixture be at least 20% of the weight of the water, but the upper limit is set inherently by the solubility in water of the components ultimately incorporated in the cellular plastic at the prevailing temperature.

The gas pressure at the nozzle must be higher than atmospheric pressure, but is otherwise not critical. A pressure of approximately 60 p.s.i.g. usually offers a most economical combination of low operating cost for the necessary compressor or other source of gas and high foam output.

The shape in which the cellular plastic composition is ultimately obtained may be selected by injecting the foam into a suitably shaped mold or by cutting and otherwise shaping a block of cellular material initially produced.

The following Examples are illustrative of basically known techniques based on Bauer U.S. Pat. No. 2,860,856.

EXAMPLE 1

An aqueous solution of 300 g/l urea containing formaldehyde in an excess of 4% over that needed for condensation with the urea to dimethylolurea was further mixed with 35 g/l glucose and other carbohydrates in the form of corn syrup. The prepolymer solution was mixed in a nozzle with a small amount of an aqueous solution of phosphoric acid as a curing and hardening agent and 2% Tween 40 (a commercial grade of sorbitan monopalmitate polyoxyalkylene derivative) as a surface active foaming agent. The mixed solutions were discharged from the nozzle into the atmosphere in a mold under the pressure of compressed nitrogen (approximately 60–70 p.s.i.g.) as a foam which rapidly expanded upon leaving the nozzle and solidified sufficiently to be shape-retaining after less than five minutes so that it could be unmolded. It lost practically its entire water content by evaporation into the ambient atmosphere at the prevailing temperature of approximately 20°–25° C within two days, the exact drying time being closely related to the thickness of the foam layer, to the velocity of air streams, and similar variables whose influence on drying processes is well understood.

EXAMPLE 2

In the nozzle of the Bauer apparatus employed in Example 1, a 32% aqueous solution of urea-formaldehyde precondensate (mole ratio 1:2) containing 12% fructose, based on the weight of the prepolymer, was mixed with an aqueous solution of 9% Nacconol SZA, a surfactant of the sodium alkylarylsulfonate type, and 1% phosphoric acid at a ratio of 10 parts prepolymer to 9 parts acidified surfactant solution. The mixture was discharged from the nozzle into the atmosphere by means of compressed air dispersed in the mixed liquids at 65 p.s.i. The stream of discharged foam was permitted to settle on a horizontal surface where mounds of foam quickly solidified. After airdrying, the composition bounding a multiplicity of gas-filled cavities had a bulk density of approximately 10 grams per liter and was cut into slabs.

It should be understood, of course, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A cellular plastic composition bounding a multiplicity of gas-filled cavities, said composition essentially consisting of urea-formaldehyde resin and at least one carbohydrate of the group consisting of glucose, fructose, maltose, and sucrose in an amount of 5 to 20% of the weight of said resin, said member being uniformly distributed in said resin.

2. A composition as set forth in claim 1, wherein said at least one carbohydrate is glucose.

3. A composition as set forth in claim 1, wherein said at least one carbohydrate is fructose.

4. A method of producing the composition set forth in claim 1 which comprises:

(1) discharging into the atmosphere a mixture of a gas under a pressure higher than atmospheric pressure and an aqueous solution, the solutes in said solution consisting essentially of at least one prepolymer selected from the group consisting of monomethylolurea and dimethylolurea, an amount of said at least one carbohydrate equal in weight to 5 to 20% of said prepolymer, and a catalyst effective for curing the prepolymer in the discharged solution to a solid ureaformaldehyde resin; and (2) evaporating the water in said mixture.

5. A method as set forth in claim 4, wherein said water is evaporated at a temperature above 0° C, but not higher than 40° C.

6. A method as set forth in claim 5, wherein said catalyst is phosphoric acid.

7. A method as set forth in claim 5, wherein the combined weight of said solutes is at least 20% of the weight of the water in said aqueous solution.

8. A composition as set forth in claim 1, wherein the amount of said at least one carbohydrate is approximately 13% of the weight of said resin.

9. A method as set forth in claim 4, wherein the amount of said at least one carbohydrate is approximately 13% of the weight of said prepolymer.

* * * * *